Dec. 8, 1964  G. J. MARTIN  3,160,167
VALVE ASSEMBLY
Filed Feb. 16, 1962  2 Sheets-Sheet 2
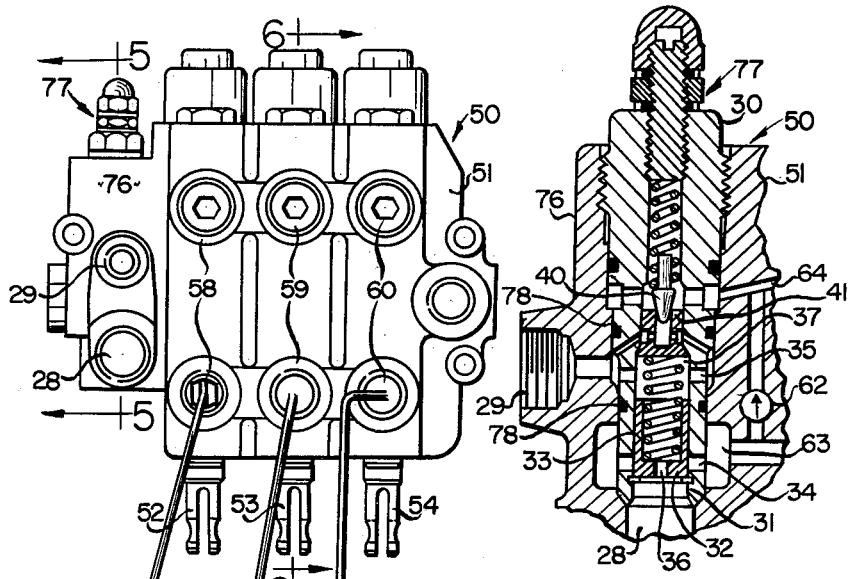
FIG 4   FIG 5
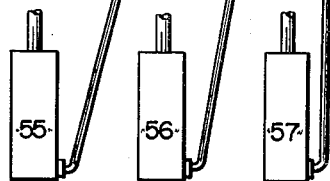
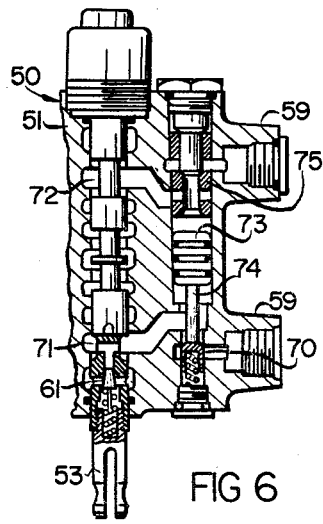
FIG 6
INVENTOR.
GEORGE J. MARTIN
BY
Oberlin, Maky & Donnelly
ATTORNEYS

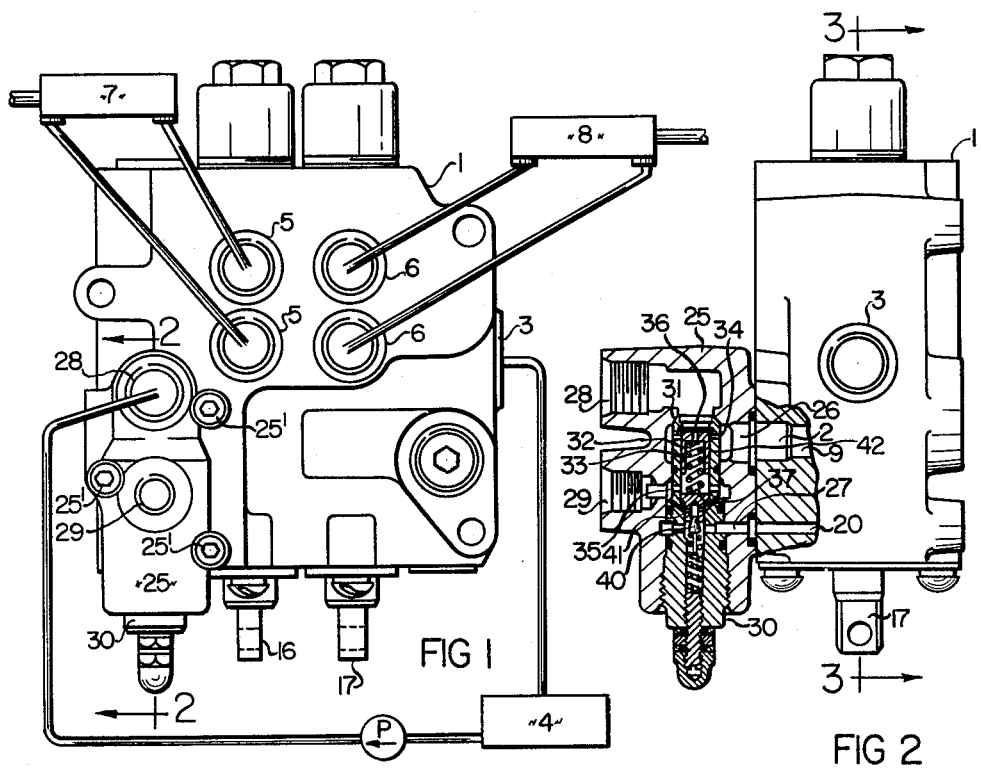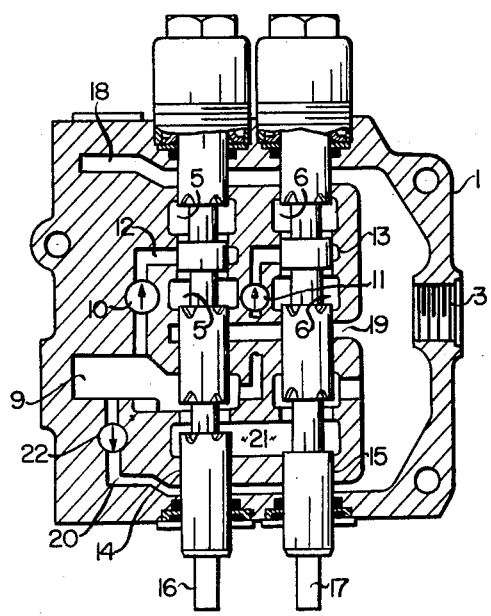

United States Patent Office 3,160,167
Patented Dec. 8, 1964

3,160,167
VALVE ASSEMBLY
George J. Martin, Lyndhurst, Ohio, assignor to Parker-Hannifin Corporation, Cleveland, Ohio, a corporation of Ohio
Filed Feb. 16, 1962, Ser. No. 173,790
5 Claims. (Cl. 137—101)

The present invention relates generally as indicated to a valve assembly and more particularly to a flow divider and priority valve assembly for use in a hydraulic system having a plurality of hydraulically actuated units of which at least one unit, hereinafter referred to as a "priority unit," must at all times have fluid available from the system in preference to those in a so-called "auxiliary circuit."

In material handling equipment such as a lift truck, for example, it is common practice to provide a hydraulic system including directional control valves for the hoist cylinder, the tilt cylinder, etc. Such equipment often is provided with power steering mechanism also utilizing fluid under pressure delivered by the same hydraulic system pump that delivers fluid under pressure for operation of the aforesaid cylinders of the so-called "auxiliary circuit" as distinguished from the "priority circuit" (the steering circuit herein). Accordingly, the steering control or other priority circuit must have preference over the auxiliary circuit so that the operator of the equipment will, at all times, have complete control of the equipment even though any or all of the cylinders are using fluid under pressure at the same time. Of course, when the fluid supply is more than adequate for the power steering control circuit, it is desirable that the surplus fluid be available for the actuation of the hoist, tilt and other cylinders of the auxiliary circuit.

Accordingly, it is a principal object of this invention to provide a novel form of flow divider and priority valve to achieve the foregoing ends, i.e., to make available for the priority circuit a predetermined minimum flow of fluid at all times and to make available the excess fluid for operating the auxiliary circuits via the flow divider and priority valve.

It is another object of this invention to provide a self-contained flow divider and priority valve assembly for attachment to a conventional directional control valve to enable the latter to be used in a hydraulic system having such priority circuit.

It is another object of this invention to provide a flow divider and priority valve which is arranged to deliver a preselected constant flow of fluid to the priority circuit regardless of variation in fluid pressure delivered to the main inlet port thereof, from which the fluid flow is divided for use in the priority circuit and in the auxiliary circuit.

It is another object of this invention to provide a flow divider and priority valve which is self-contained for use with a conventional directional control valve and which has its own relief valve for relieving the priority circuit pressure independently of the auxiliary circuit pressure.

It is another object of this invention to provide a flow divider and priority valve which is in the form of a separate valve assembly having a main inlet port, a priority circuit port, and ports for conducting excess fluid not needed by the priority circuit to a directional control valve for actuation of the cylinders of the auxiliary circuit.

It is another object of this invention to provide a flow divider and priority valve which is in the form of a self-contained unit which can be precalibrated and merely substituted for a plug in a conventional directional control valve to convert the latter for use in a hydraulic system having priority and auxiliary circuits.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of a few of the various ways in which the principle of the invention may be employed.

In said annexed drawings:

FIG. 1 is a front elevation view of a conventional directional control valve for a plurality of fluid motors in combination with a flow divider and priority valve;

FIG. 2 is a fragmentary cross-section view taken substantially along the line 2—2, FIG. 1;

FIG. 3 is a central vertical section through the directional control valve along the line 3—3, FIG. 2 which passes through the parallel axes of the spools of the directional control valve;

FIG. 4 is a front elevation view of another embodiment of this invention wherein the flow divider and priority valve housing is an integral part of the directional control valve housing;

FIG. 5 is a fragmentary cross-section view taken substantially along the line 5—5, FIG. 4 and;

FIG. 6 is a cross-section view taken substantially along the line 6—6, FIG. 4.

Referring now more particularly to the drawings, and first to FIGS. 1 to 3, the directional control valve housing 1 is of more or less conventional form including an inlet port 2 for fluid under pressure, a tank port 3 for returning fluid to a reservoir or tank 4, pairs of motor ports 5, 5 and 6, 6 for connection with double-acting fluid motors 7 and 8, and in the case of single acting fluid motors, one port of each pair 5, 5 and 6, 6 will be plugged. The housing 1 is appropriately cored to provide an inlet chamber 9 from which fluid under pressure passes via check valves 10 and 11 to the respective feed passages 12 and 13 intersecting the spool bores 14 and 15, whereby fluid under pressure may be directed into either motor port of each pair 5, 5 and 6, 6 depending on the axial position of the associated spool 16 and 17. The housing 1 is also formed with return passages 18, 19, and 20 leading to the tank port 3 to communicate the other motor port of each pair 5, 5 and 6, 6 with the tank port 3 when the associated spool 16 or 17 is in the aforesaid operating position. The housing also has a bypass passage 21 which communicates the inlet chamber 9 with the tank port 3 when both spools 16 and 17 are in neutral position as shown in FIG. 3 blocking pressure feed from pressure feed passages 12 and 13 to the motor ports 5, 5 and 6, 6. Also leading from the inlet chamber 9 to return passage 20 is a conventional pressure relief valve 22 to preclude build-up of fluid pressure in the inlet chamber 9 above a predetermined value.

The directional control valve thus far described is, as aforesaid, more or less conventional and it is to be understood that various forms of spools may be employed according to the nature of the fluid motor controlled thereby. Thus, the spools 16 and 17 herein are double acting spools for use in conjunction wtih double acting fluid motors 7 and 8. Moreover, the present valve makes provision for separate or simultaneous actuation of the motors 7 and 8 and, as known in the art, the housing 1 may be cored to provide for control of but one motor at a time or for series control of successive motors.

As best shown in FIGS. 1 and 2, the flow divider and priority valve housing 25 is secured directly on the directional control valve housing 1 by the screws 25', said priority valve housing 25 having ports 26 and 27 respectively registering with the inlet port 2 and with the tank passage 20 of the directional control valve housing 1.

Said priority valve housing 25 has a main inlet port 28 for connection with the hydraulic system pump P and a priority 29 which, for example, leads to the power steering circuit or another priority circuit which must be assured of adequate fluid supply.

Screwed into the priority valve housing 25 is the unitary tubular body 30 for the combined flow divider, priority, and relief valve assembly. The body 30 at one end is seated against the shoulder 31 in the housing 25 and has a flow divider valve member 32 which is biased by the spring 33 to a position closing fluid communication between the main inlet port 28 of the priority housing 25 and the inlet port 2 of the directional control valve housing 1. In the position shown in FIG. 2, the flow divider valve member 32 overlies the axially staggered radial passages 34 through the wall of the body 30. Axially spaced from these radial passages 34 are axially staggered radial outlet passages 35 which lead to the priority port 29. The flow divider valve member 32 has an orifice 36 therethrough which communicates the main inlet port 28 with the chamber 37 and the chamber 37, in turn, is communicated with the priority port 29 via the last-mentioned radial passages 35 through the wall of the body 30. Accordingly, so long as the hydraulic system pump P is delivering fluid under pressure into the main inlet port 28 there will be desired flow of fluid to the priority port 29 via the orifice 36, the chamber 37, and the passages 35. As an example, if it is desired to maintain a constant flow of 2 gallons per minute fluid flow to the priority port 29, and that amount is all that is being delivered by the pump P, the pressure drop across the orifice 36 in relation to the spring bias will be such that the flow divider valve member will remain in the FIG. 2 position closing the passages 34 to the directional control valve inlet port 2, whereby there is no excess fluid delivered to the auxiliary circuit. However, the pump capacity, of course, will always be greater than the minimum requirements of the priority circuit and, therefore, when the flow through the orifice 36 commences to increase above the desired value, the pressure drop across the orifice 36 will be sufficient to move the flow divider valve member 32 against spring 33 to a position uncovering radial passages 34, the extent of uncovering depending on the magnitude of the excess flow. Thus, the flow divider valve member 32 constitutes a metering valve to supply excess fluid to the auxiliary circuit over and above that required for the priority circuit.

The body 30 also has a spring biased relief valve member 40 therein which is engaged with seat 41 to close communication of the priority port 29 with the tank passage 20 except when the fluid pressure in the priority port 29 exceeds a predetermined value.

In order to maintain a substantially constant flow of fluid to the priority port 29 irrespective of the pressure of fluid in the directional control valve inlet 2 as this pressure changes due to actuation of either spool 16 or 17, it is to be noted that after the flow divider valve member 32 has uncovered the passages 34 to full extent, the skirt 42 of the flow divider valve member 32 will commence progressively to cover the outlet passages 35, thus to effect a progressively increasing pressure drop between the chamber 37 and the priority port 29 to maintain a predetermined pressure drop (within close limits) across the orifice 36 with consequent predetermined flow therethrough into the priority circuit.

Referring now to the embodiments of the invention shown in FIGS. 4 to 6, again there is provided a directional control valve 50 of more or less conventional form, including a housing 51 in which three spools 52, 53, and 54 are mounted for controlling the operation of three fluid motors 55, 56 and 57 in the auxiliary circuit. Merely by way of example, the spools 52, 53, and 54 are disposed for actuating single acting fluid motors 55, 56, and 57, whereby one port of each of the three pairs of motor ports 58, 58, 59, 59 and 60, 60 is plugged as shown. The middle spool 53, as shown in cross-section in FIG. 6, is also of the same type as the other two spools 52 and 54 except that it has a built-in relief valve 61 to prevent overload of the associated motor circuit, such relief valve 61 being set for a lower pressure than the main system relief valve 62 which is disposed between the auxiliary system inlet chamber 63 and the tank passage 64 (see FIG. 5).

In the FIGS. 4 to 6 directional control valve 50 there are provided pilot operated check valves 70 in association with each of the spools 52, 53, and 54 and it can be seen that when the associated spool (see spool 53 in FIG. 6) is shifted to an operating position, pressure in the lower passage 71 will unseat the check valve 70 for conducting fluid under pressure to the motor port 59. On the other hand, when the spool 53 is operated to conduct fluid under pressure into the other passage 72 to upper port 59 which, in this case, is plugged, such pressure will act on the plunger 73, whereby the stem 74 thereof will engage the check valve 70 to unseat it to permit return flow from the bottom motor port 59 into what is now the return passage 71. It is to be understood that in the case of a pilot operated check valve assembly for a double acting spool, a similar check valve 70 will be disposed to engage the seat 75 and the plunger 73 will be provided with another stem to unseat that check valve for return flow from the top motor port 59, the plunger 73 being moved upwardly by fluid under pressure in passage 71 on the underside thereof.

Aside from the foregoing, essentially the only difference between the FIG. 1 and FIG. 4 assemblies is that the flow divider and priority valve housing 76 is an integral part of the directional control valve housing 51 in FIG. 4, whereas, in FIG. 1, as previously described, the flow divider and priority valve housing 25 is bolted to the directional control valve housing 1.

In either case, the cartridge 77 comprising the body 30, the spring biased flow divider valve member 32, and the priority relief valve 40, is the same in both cases. In the case of the FIG. 4 embodiment such cartridge 77 is merely screwed into the directional control valve housing 51 to isolate the main inlet port 28 from the auxiliary inlet chamber 63 except past the flow divider valve member 32, whereby only fluid in excess of that required for the priority circuit can pass from the main inlet port 28 into the auxiliary inlet chamber 63. In FIG. 4 the main inlet port 28 is formed as a part of the directional control valve housing 51 and similarly, the priority port 29 is a part of the directional control valve housing 51.

When the hydraulic system in which the FIG. 4 directional control valve is used does not have a priority circuit, all that it is necessary to do is to unscrew the flow divider and priority valve cartridge 77 and to replace it with a plug that establishes a seal in the bore 78 between the inlet chamber 63 and the return passage 64, and either another seal in the bore 78 between the inlet chamber 63 and the priority port 29 or a second plug in the priority port 29. In this connection, the FIGS. 1 to 3 embodiment only requires removal of the priority housing 25 from the directional control valve housing 1 and plugging of the tank passage 20 whereby the directional control valve assembly may be employed in ordinary manner where there is no priority circuit in the hydraulic system.

Other modes of applying the principle of the invention may be employed, change being made as regards the details described, provided the features stated in any of the following claims, or the equivalent of such, be employed.

I therefore particularly point out and distinctly claim as my invention:

1. In combination with a directional control valve, a flow divider and priority valve for installation in the pressure inlet circuit of said directional control valve, said flow divider and priority valve comprising a self-contained cartridge unit detachably mounted in a bore in said directional control valve, said cartridge unit including a tubular body closed at one end to form a fluid tight seal with one end of said bore and open at the other end to the pressure inlet of said directional control valve and having radial openings adjacent to said other end leading to said directional control valve, a valve member axially movable in said tubular body between closed and open positions respectively blocking and opening fluid communication between said other end and said openings, said tubular body having an outlet port which is in constant restricted communication with its open end for flow of fluid to a fluid pressure operated unit at all times, and means biasing said valve member to closed position except when the flow rate to said outlet port via said restricted communication exceeds a predetermined value.

2. The combination of claim 1 wherein said valve member has an orifice therethrough establishing such restricted fluid communication between such open end and said outlet port, said body has other radial openings defining a chamber between said valve member and said outlet port, and said valve member, when in open position, progressively covers said other radial openings to build up back pressure in said chamber and thus limit the flow rate of fluid to said outlet port.

3. The combination of claim 1 wherein said tubular body has, at said one end, a relief valve assembly with a pressure port leading to said outlet port and a relief port adapted to communicate with a return port of said directional control valve.

4. In combination with a directional control valve, a flow divider and priority valve for installation in the pressure inlet circuit of said directional control valve, said flow divider and priority valve comprising a housing having a bore therein and a self-contained cartridge unit detachably mounted in said bore, said housing being detachably secured to said directional control valve, said cartridge unit comprising a tubular body closed at one end to form a fluid tight seal with one end of said bore and open at the other end to the pressure inlet of said directional control valve and having radial openings adjacent to said other end leading to said directional control valve, a valve member axially movable in said body between closed and open positions respectively blocking and opening fluid communication between said other end and said openings, said tubular body having an outlet port which is in constant restricted communication with its open end for flow of fluid to a fluid pressure operated unit at all times, and means biasing said valve member to closed position except when the flow rate to said outlet port via said restricted communication exceeds a predetermined value.

5. The combination of claim 4 wherein said tubular body has, at said one end, a relief valve assembly with a pressure port leading to said outlet port and a relief port adapted to communicate with a return port of said directional control valve.

References Cited in the file of this patent

UNITED STATES PATENTS

| Re. 24,892 | Banker | Oct. 25, 1960 |
| 2,622,611 | Stark | Dec. 23, 1952 |
| 2,737,196 | Eames | Mar. 6, 1956 |
| 2,818,711 | Lincoln et al. | Jan. 7, 1958 |
| 2,846,850 | Hall | Aug. 12, 1958 |
| 2,988,106 | Rue | June 13, 1961 |
| 2,995,141 | Hipp | Aug. 8, 1961 |
| 3,000,397 | Schmiel | Sept. 19, 1961 |
| 3,024,798 | Banker | Mar. 13, 1962 |
| 3,033,221 | Strader | May 8, 1962 |
| 3,077,901 | Klessig | Feb. 19, 1963 |